US012736394B2

(12) United States Patent
Tsao

(10) Patent No.: US 12,736,394 B2
(45) Date of Patent: Sep. 15, 2026

(54) WEIGHT MEASURING APPARATUS

(71) Applicant: Yu-Min Tsao, Keelung City (TW)

(72) Inventor: Yu-Min Tsao, Keelung City (TW)

(*) Notice: Subject to any disclaimer, the term of this patent is extended or adjusted under 35 U.S.C. 154(b) by 337 days.

(21) Appl. No.: 18/520,109

(22) Filed: Nov. 27, 2023

(65) Prior Publication Data

US 2024/0247971 A1 Jul. 25, 2024

(30) Foreign Application Priority Data

Jan. 19, 2023 (TW) ................................ 112200766
May 10, 2023 (TW) ................................ 112117389
May 10, 2023 (TW) ................................ 112204594

(51) Int. Cl.
*G01G 21/28* (2006.01)
*G01G 3/14* (2006.01)
*G01G 19/52* (2006.01)
*G01G 23/32* (2006.01)

(52) U.S. Cl.
CPC ......... *G01G 21/283* (2013.01); *G01G 3/1402* (2013.01); *G01G 19/52* (2013.01); *G01G 23/32* (2013.01)

(58) Field of Classification Search
CPC .... G01G 21/283; G01G 3/1402; G01G 19/52; G01G 23/32; G01G 21/23; G01G 19/44; G01G 23/3714; G01G 23/3721
USPC ........................................................ 177/238
See application file for complete search history.

(56) References Cited

U.S. PATENT DOCUMENTS 4,177,868 A * 12/1979 Sanders ............... G01G 3/1406 177/DIG. 3
5,283,395 A * 2/1994 Pitaud ...................... G01G 3/12 177/229
5,880,677 A * 3/1999 Lestician ............... G01D 4/004 307/17
5,884,003 A * 3/1999 Cloud ................. G02B 6/4447 385/136
6,340,799 B1 * 1/2002 Hama .................... G01G 21/23 177/184
9,761,180 B2 * 9/2017 Ogawa ................... G09G 3/344
9,813,657 B2 * 11/2017 Chiu ....................... H04N 5/60
11,169,017 B1 * 11/2021 Huckestein ............ A47K 3/002
2002/0134593 A1 * 9/2002 Lee ....................... G01G 19/00 177/245

FOREIGN PATENT DOCUMENTS

KR 102394047 B * 5/2022 ................ B64F 5/10
TW WM329950 U * 4/2008

* cited by examiner

*Primary Examiner* — John E Breene

(57) ABSTRACT

A base for being disposed on a ground, comprising a first plate, a second plate, and a weight measuring device disposed between the first plate and the second plate, wherein the base comprises no active device; and a display unit comprising a display panel and a control circuit, for being disposed separately from the base, wherein the control circuit is electrically connected to the weight measuring device through a transmission unit and detects a deformation of the weight measuring device through the transmission unit, wherein the display panel displays a weight value related to the deformation.

15 Claims, 11 Drawing Sheets

WEIGHT MEASURING APPARATUS

BACKGROUND OF THE INVENTION

1. Field of the Invention

The present invention relates to a weight measuring apparatus, particularly to a thin and compact weight measuring device that can be installed in bathroom facilities such as toilets and urinals.

2. Description of the Prior Art

The display unit and the weight measuring apparatus of the conventional electronic (or digital) weight measurement apparatus are both disposed on the ground.

It is inconvenient to visually receive the weight information. Furthermore, the conventional methods of weight measurement typically require the users to take off the clothes, shoes, and various accessories as possible as much in order to measure the absolute value of body weight, while neglecting the importance of the relative reference values of body weights, right before and after eating or defecating.

SUMMARY OF THE INVENTION

In view of the inconvenience mentioned above, an embodiment of the present invention provides a weight measurement apparatus, comprising a base for being disposed on a ground, comprising a first plate, a second plate, and a weight measuring device disposed between the first plate and the second plate, wherein the base comprises no active device; and a display unit comprising a display panel and a control circuit, for being disposed separately from the base, wherein the control circuit is electrically connected to the weight measuring device through a transmission unit and detects a deformation of the weight measuring device through the transmission unit, wherein the display panel displays a weight value related to the deformation.

An embodiment of the present invention provides a weight measurement apparatus, comprising a base for being disposed on a ground, comprising a first plate, a second plate, and a weight measuring device disposed between the first plate and the second plate; and a display unit comprising a display panel, a control circuit, and a sensing activation device, for being disposed separately from the base, wherein the sensing activation device activates the display panel and the control circuit by sensing a gesture, wherein the control circuit is electrically connected to the weight measuring device through a transmission unit and detects a deformation of the weight measuring device through the transmission unit, wherein the display panel displays a weight value related to the deformation.

An embodiment of the present invention provides a weight measurement apparatus, comprising a base for being disposed on a ground, comprising a first plate, a second plate, and a weight measuring device disposed between the first plate and the second plate, wherein a lateral side of the base comprises a concave area, wherein the concave area is paired with a floor-mounted urinal or a floor-mounted toilet; and a display unit comprising a display panel and a control circuit, for being disposed on a wall, wherein the control circuit is electrically connected to the weight measuring device through a transmission unit and detects a deformation of the weight measuring device through the transmission unit, wherein the display panel displays a weight value related to the deformation.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

Figure 1:
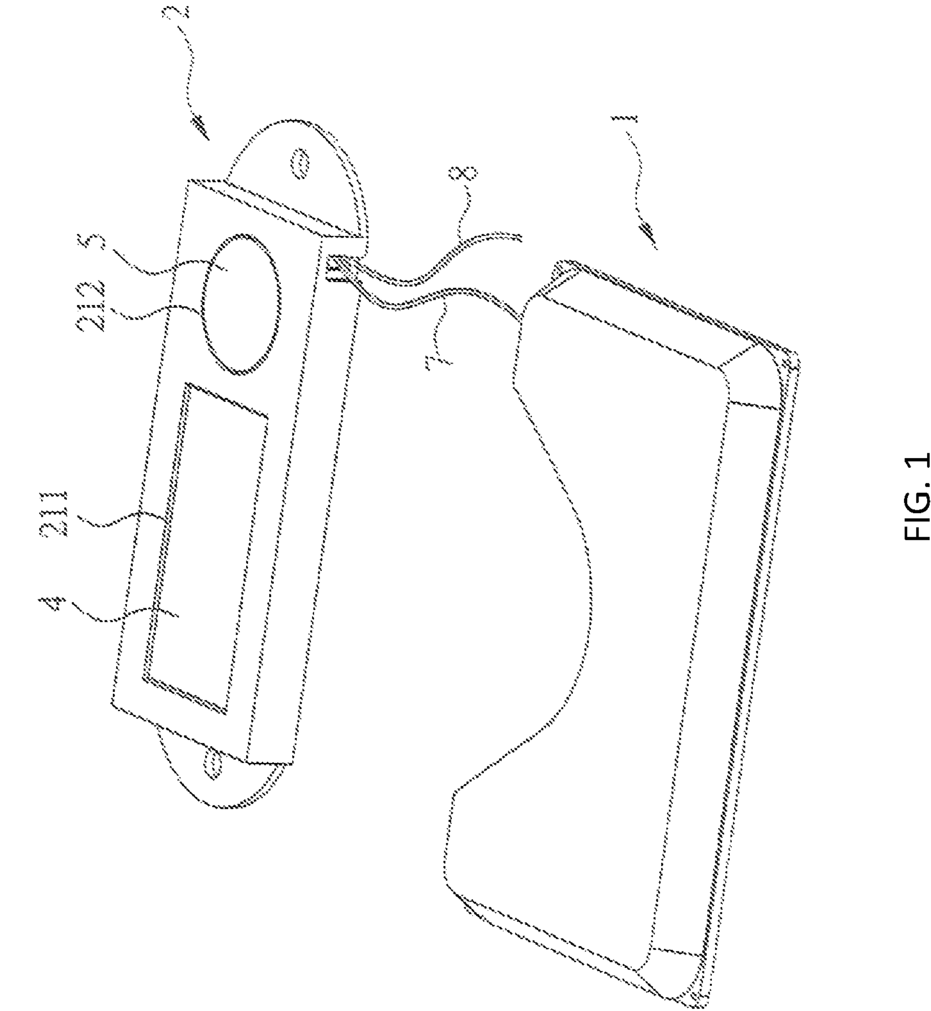
FIG. 1 illustrates the three-dimensional illustration of the invention.
Figure 2:
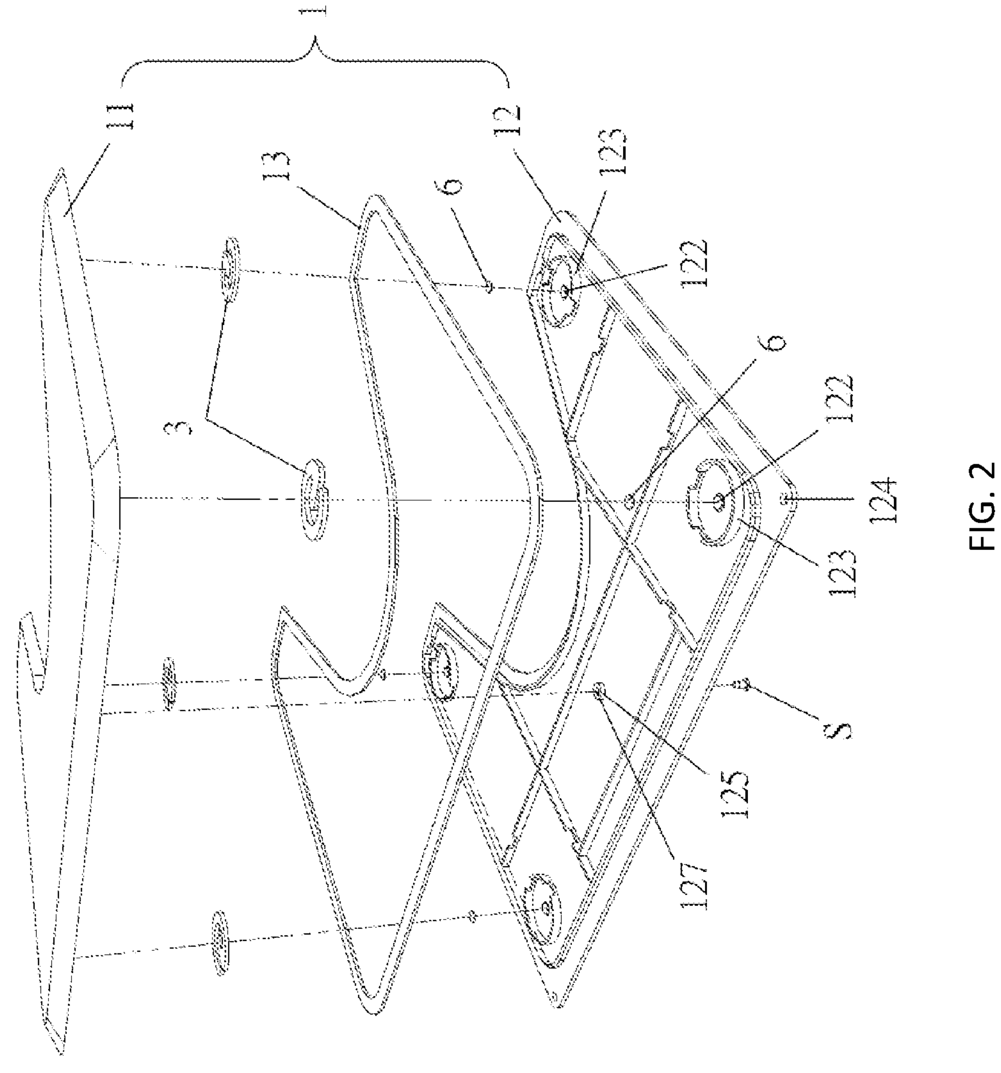
FIG. 2 illustrates an exploded view of the base of the invention.
Figure 3:
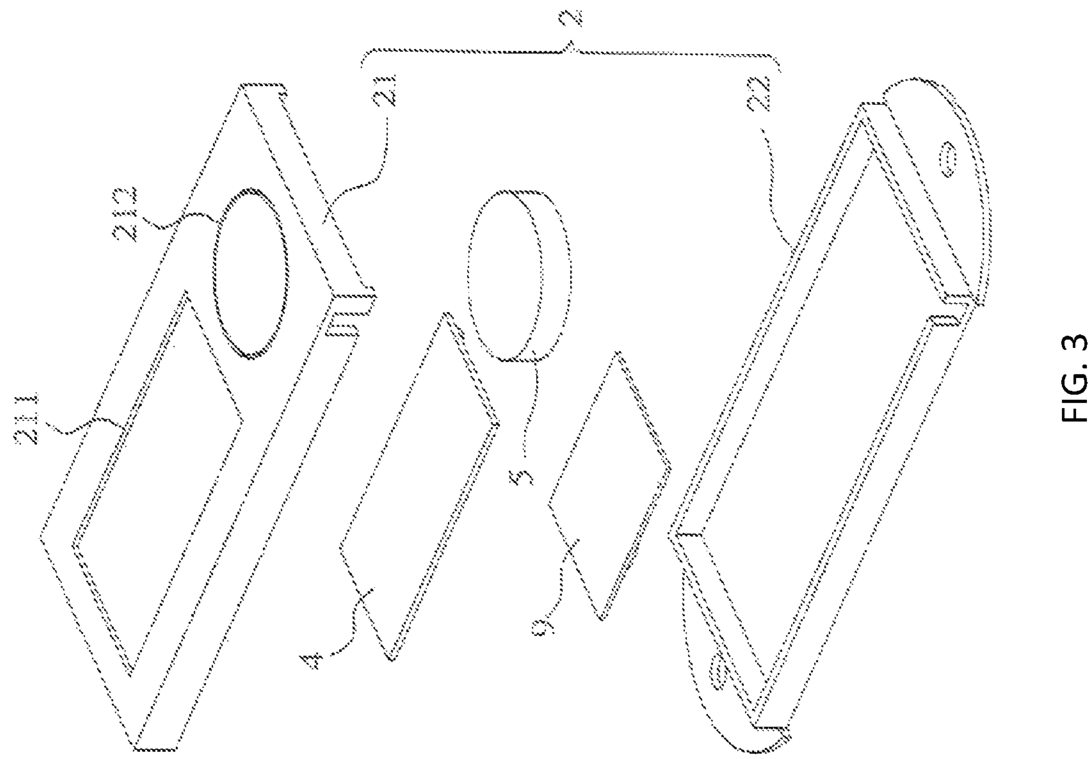
FIG. 3 illustrates an exploded view of the display unit of the invention.

As shown in FIG. 1 to FIG. 3, the weight measurement apparatus 100 in this embodiment comprising a base 1, a display unit 2, a weight measuring device 3, a supporting unit 6, a transmission unit 7, and a control circuit 9. The display unit 2 comprising a display panel 4, a sensing activation device 5, an external power cable 8, and a control circuit 9. The weight measuring device 3, the display panel 4, and the sensing activation device 5 are electrically connected to the control circuit 9. In this embodiment, the sensing activation device 5 is a proximity hand wave sensor activator and can activate the panel and control circuit by sensing a gesture, the supporting unit 6 is a metal block and supports the center point of the weight measuring device 3, the transmission unit 7 is a copper wire, the external power cable 8 is a general DC power cable. However, the invention is not limited to these elements. The principle of the weight measuring device 3 mentioned above relies on detecting the deformation, after the sensing activation device 5 activates the control circuit 9, which generates a corresponding change in resistance. This change in resistance is measured by the control circuit 9 through the transmission unit 7 to determine the corresponding voltage or current, achieving the purpose of weight measurement.

Figure 4:
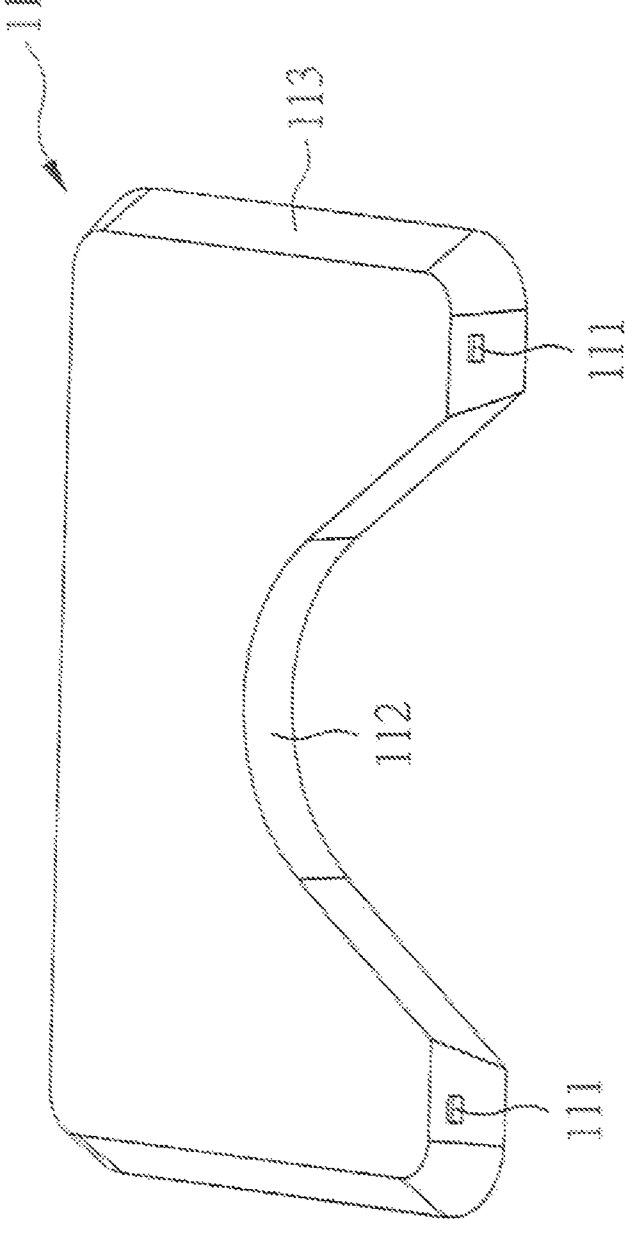
FIG. 4 illustrates a top view of the first plate of the base of the invention.
Figure 5:
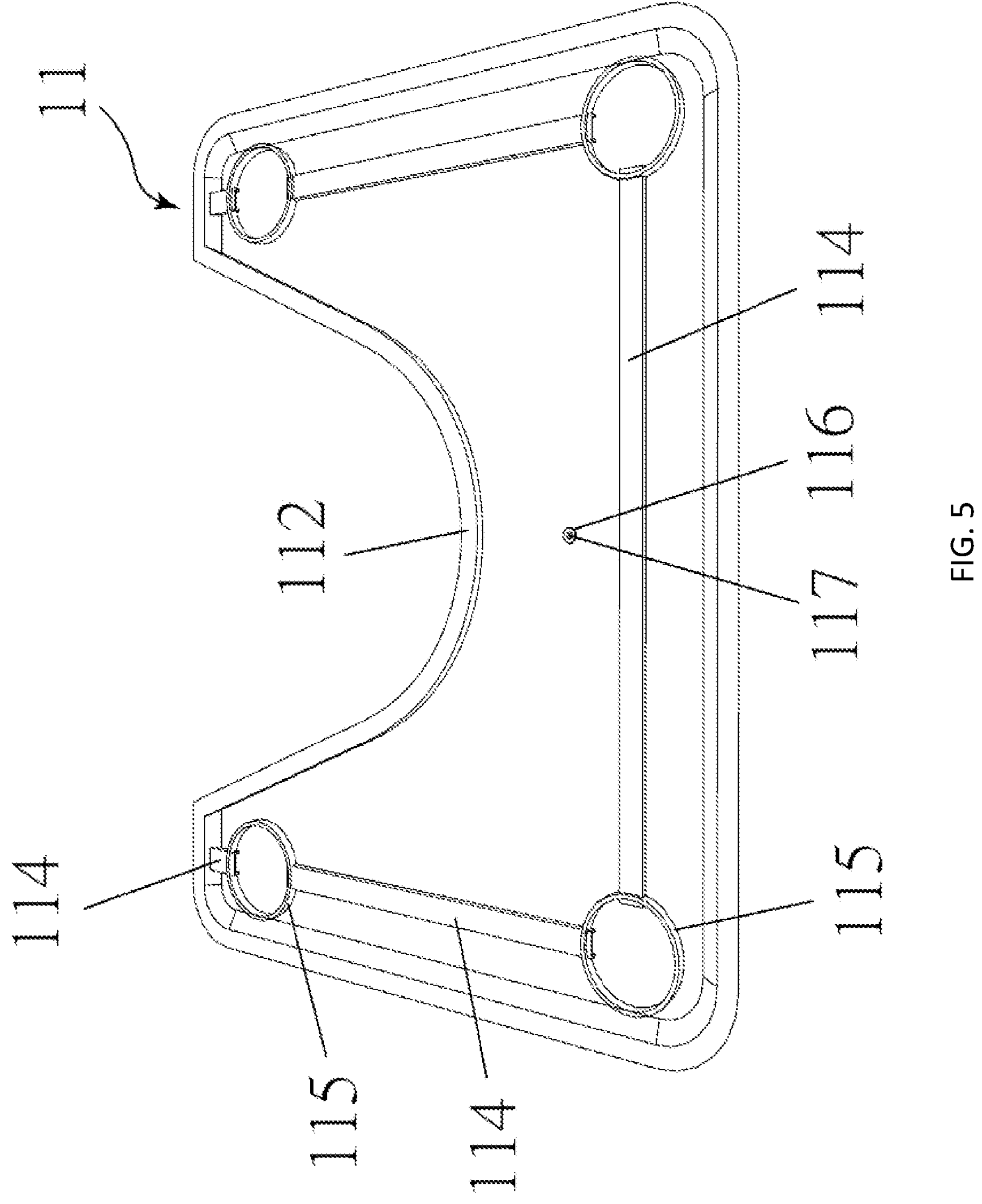
FIG. 5 illustrates a bottom view of the first plate of the base of the invention.
Figure 6:
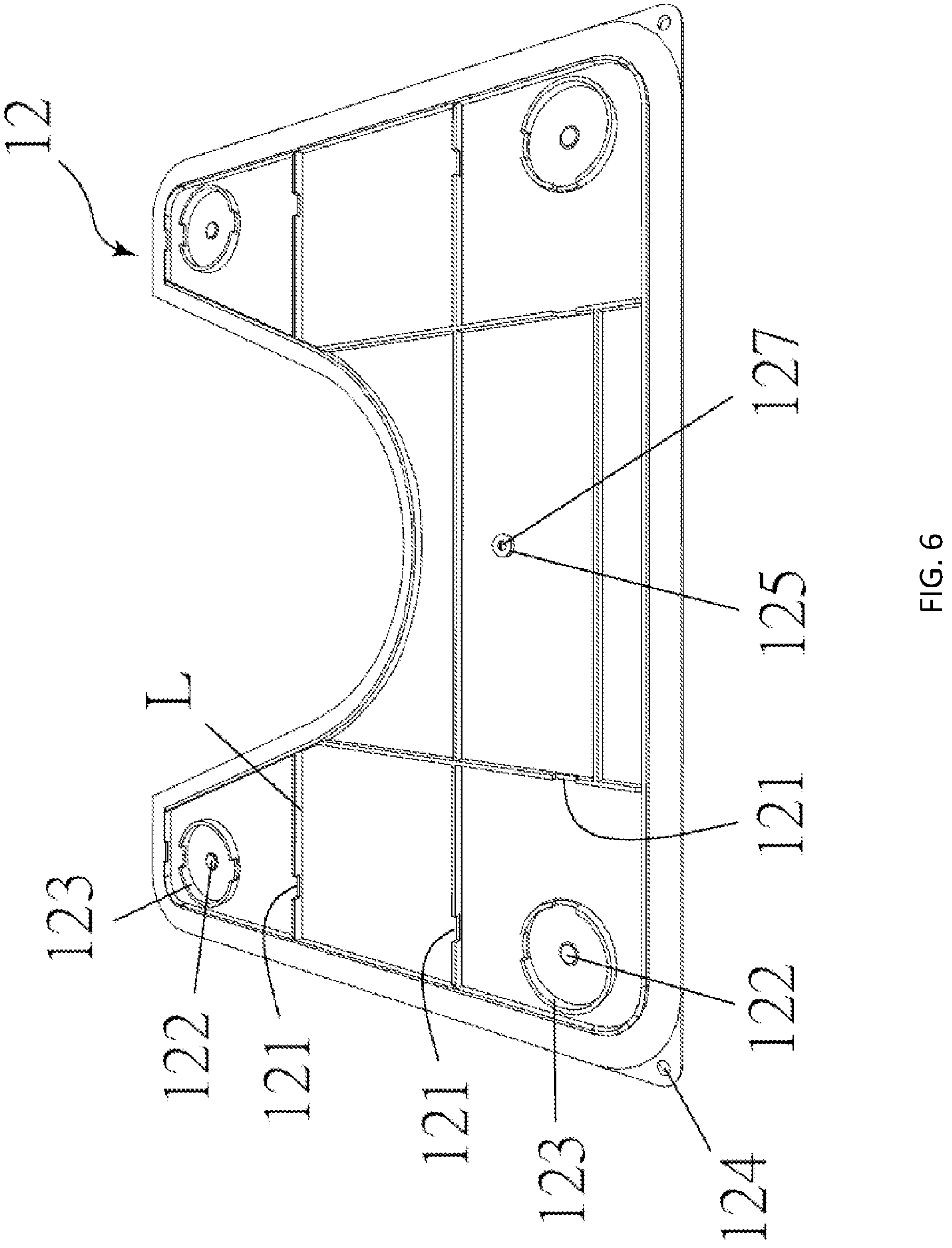
FIG. 6 illustrates a top view of the second plate of the base of the invention.

As shown in FIG. 4 to FIG. 6, please refer to FIG. 2, the base 1 in this embodiment comprises a first plate 11, a second plate 12, and a sealing foam unit 13.

The first plate 11 is provided with a circuit groove outlet 111, a vertical plan 112, an inclined plane 113, a wire casing 114, and a fixing unit 115. The second plate 12 comprises a groove 121, a fixing position 122, a waterproof unit 123, and fixed ground securing hole 124. The wire casing 114 of the first plate 11 corresponds to the groove 121 of the second plate 12, and the sealing foam unit 13 is placed between the first plate 11 and the second plate 12, wherein the transmission unit 7 is in the wire casing unit 114.

Each of the grooves 121 is respectively set on a plurality of ribs L, which are disposed in a plurality of crisscrossed ribs L for enhancing structure strength of the second plate 12.

Furthermore, the weight measuring device 3 is positioned between the first plate 11 and the second plate 12 and is disposed in the fixing unit 115. The supporting unit 6 corresponds to the fixing position 122 of the second plate 12 and is positioned between the weight measuring device 3 and the second plate 12. The inner diameter of the fixing unit 115 is larger than the outer diameter of the waterproof unit 123 and the inner diameter of the waterproof unit 123 is larger than the outer diameter of the weight measuring device 3.

More specifically, the supporting unit 6 is fixed to the fixing position 122 of the second plate 12. In this embodiment, the quantity of the weight measuring device 3, the supporting unit 6, the fixing unit 115, and the waterproof unit 123 is four for each, but the invention is not limited to this quantity. As long as the quantity of the weight measuring device 3 corresponds to the quantity of the supporting unit 6, the fixing unit 115, the fixing position 122, and the waterproof unit 123, it is acceptable.

In addition, in this embodiment, the quantity of the fixed ground securing hole 124 can be more than one. On the other hand, in this embodiment, the sealing foam unit 13 is foam rubber or soft sealant.

Figure 7:
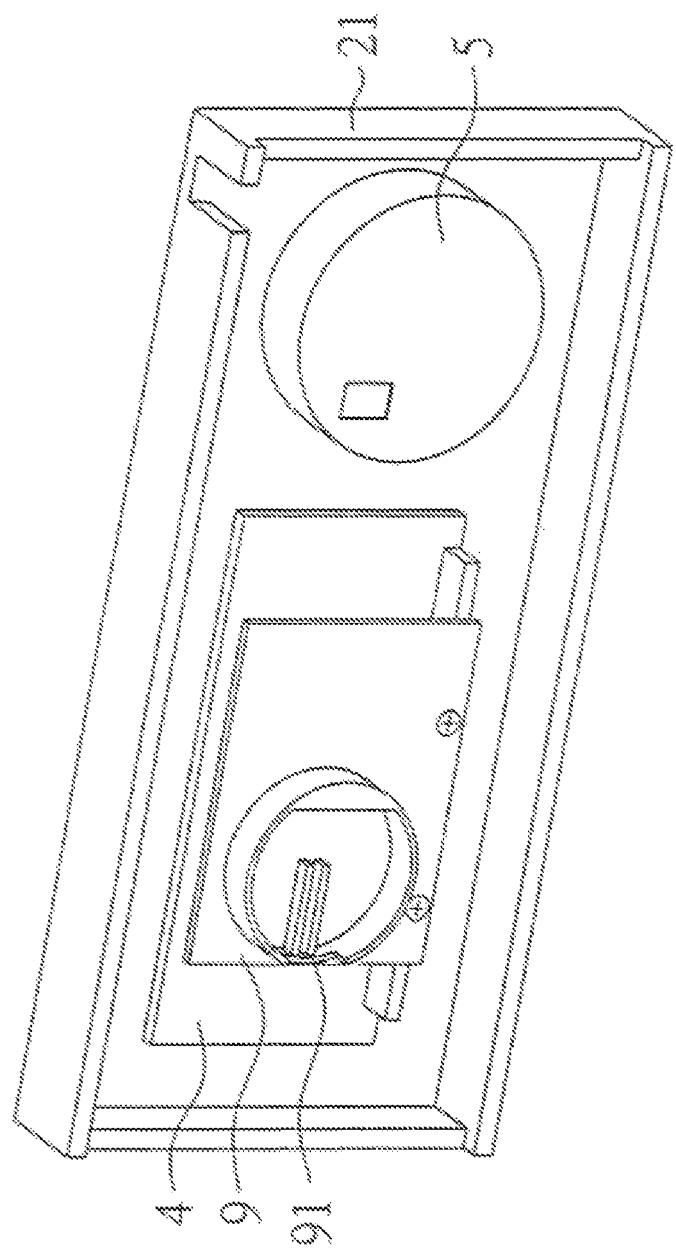
FIG. 7 illustrates a bottom view of the first case body of the display unit of the invention.
Figure 8:
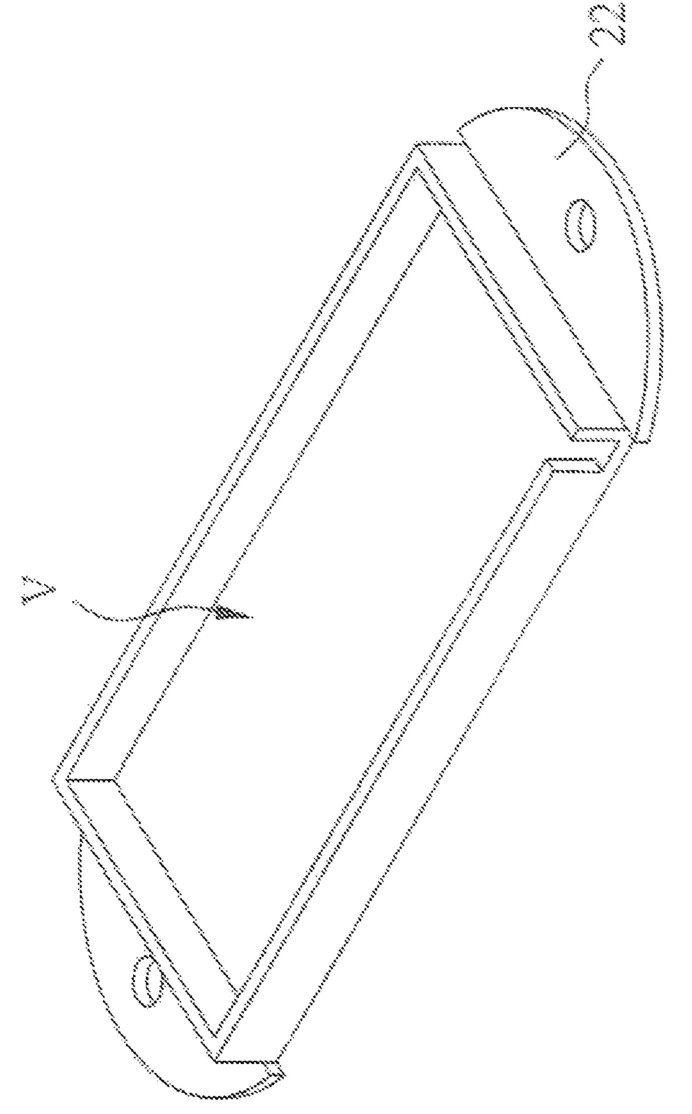
FIG. 8 illustrates a top view of the second case body of the display unit of the invention.

As shown in FIG. 7 to FIG. 8, please also refer to FIG. 1 and FIG. 3, the display unit 2 in this embodiment comprises a display panel 4, and disposed separately from the base 1. The transmission unit 7 provides an electric connection between the display unit 2 and the base 1, particularly, from the control circuit 9 to the weight measuring device 3. For instance, pressure-induced changes in resistance result in voltage variations, which are sensed by the control circuit 9 through the transmission unit 7. Furthermore, the display unit 2 comprises a first case body 21 and a second case body 22. The first case body 21 and the second case body 22 are assembled together to form an accommodation space V. Inside the accommodation space V, there is a display panel 4, a sensing activation device 5, and a control circuit 9. The first case body 21 comprises a first opening 211 and a second opening 212, wherein the display panel 4 is disposed in the first opening 211 and the sensing activation device 5 is disposed in the second opening 212. Furthermore, the control circuit 9 is connected to an external power cable 8 and a battery box 91 provide the electricity for the weight measurement apparatus 100. The battery box 91 can also be placed separately, without the need to be installed in the control circuit 9. The connection to the control circuit 9 comprises a standard wire. In another embodiment of the invention, the weight measurement apparatus 100 is connected to an external DC power source for power supply.

Figure 9:
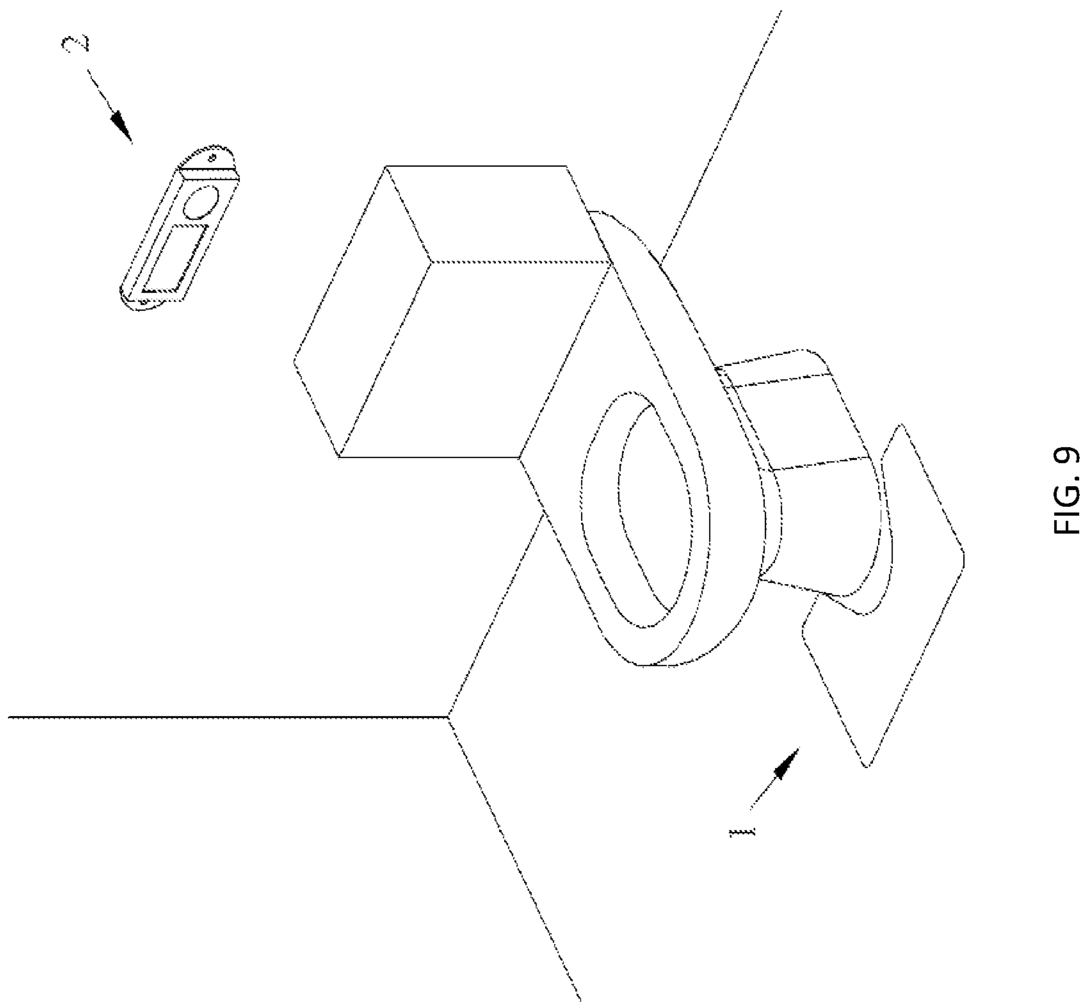
FIG. 9 illustrates a schematic illustration of the installation of the invention with a toilet.
Figure 10:
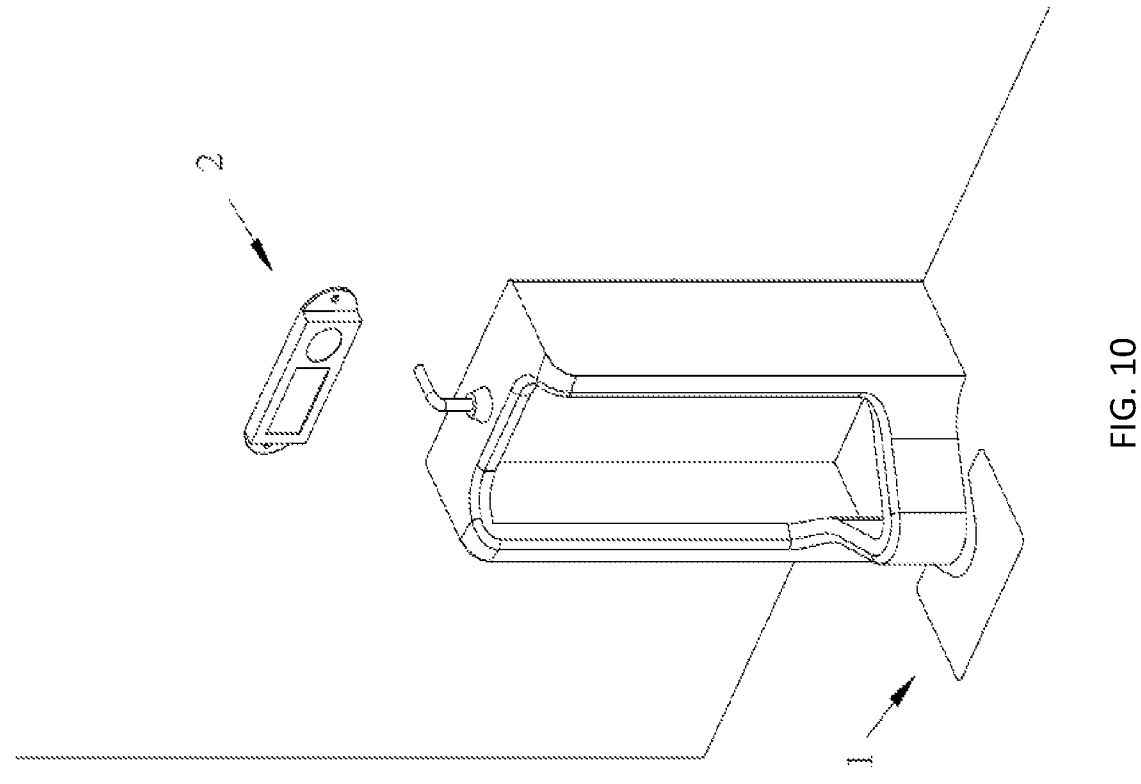
FIG. 10 illustrates a schematic illustration of the installation of the invention with a urinal.
Figure 11:
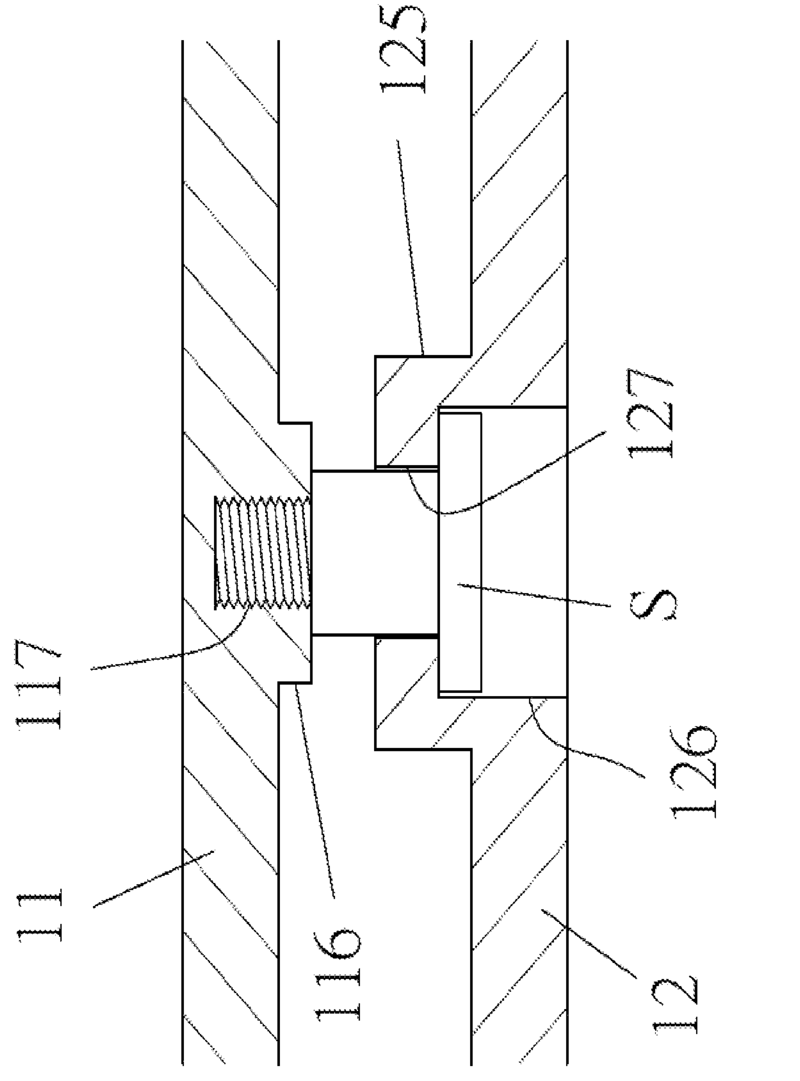
FIG. 11 illustrates a sectional view of the securing unit between the first plate and the second plate of the invention.

Please refer to FIG. 9 and FIG. 10. In this embodiment, the shape of the base 1 is non-square. One side of the base 1 is provided with a concavity. In this embodiment, the concavity has a semi-circular concave shape, and it is designed to be the vertical plan 112 and to be paired with a floor-mounted urinal or toilet.

However, the invention is not limited to this semi-circular concave shape; as long as the base 1 can match the floor-mounted urinal or toilet, it is acceptable. In addition, the design of the inclined plane 113 of the base 1 can reduce the risk of users accidentally kicking it and falling. In an embodiment, there are metal wires and the weight measuring device 3 in the base 1, but without any active device.

In an embodiment, the base 1 is disposed on the ground, and the display unit 2 is disposed on the wall, above the ground. The display unit 2 and the base 1 of the weight measurement apparatus 100 of the invention are disposed separately. Therefore, the display unit 2 can be positioned in any convenient viewing location according to actual needs, allowing measurement results to be easily observed. Its use case can involve scenarios where the user and the data viewer or recorder are not the same person. This allows for scenarios where the user and the data viewer/recorder are different individuals. For example, in a hospital, a nurse sitting at the counter can place the display unit 2 on the desk, and the base 1 is fixed outside the counter on the floor. The nurse can activate the invention by waving their hand over the sensing activation device 5 and then ask the patient to step onto the base 1 for weight measurement. The nurse can easily view and record the data. Alternatively, an additional display screen can be installed on the counter, allowing the patient to simultaneously view the data.

Furthermore, the base 1 can be fixed on the appropriate floor in front of the shoe cabinet at home, and the display unit 2 can be fixed on the wall at a comfortable viewing height for the whole family. This allows everyone in the household to conveniently measure their weight before leaving or returning home, making caring for one's health a natural part of daily life.

In addition, by simplifying the electrical structure inside the base 1 and arranging the active-device-formed components (such as the display panel 4, the sensing activation device 5, and control circuit 9) inside the display unit 2 at an elevated position above the ground, the weight measurement apparatus 100 of the invention provides the feasibility to be installed in the restroom. Therefore, the invention can be applied in humid environments to achieve the purpose for weight measuring in the present.

Please refer to FIG. 2, FIG. 5, FIG. 6, and FIG. 11. To further enhance the stability of the connection between the first plate 11 and the second plate 12, the first plate 11 comprises a first protrusion 116 at the center or spaced apart with a plurality of first protrusion 116. The first protrusion 116 has a locking hole 117 inside. There is a first gap between the wire casing 114 and the groove 121. The second plate 12 comprises at least one second protrusion 125 at the center or spaced apart with a plurality of second protrusion 125. The first protrusion 116 is disposed corresponding to the second protrusion 125, and the second protrusion 125 has a predetermined height. The bottom surface of the second plate 12 comprises a first through-hole 126 corresponding to the second protrusion 125, The top surface of the second protrusion 125 comprises a second through-hole 127 that communicates with the first through-hole 126; The inner diameter of the first through-hole 126 is larger than the inner diameter of the second through-hole 127, allowing at least one securing unit S to pass through from the bottom surface of the second plate 12 through the first through-hole 126 and the second through-hole 127. The top of the securing unit S is secured to the locking hole 117 of the first plate 11, and there is a second gap between the first protrusion 116 and the second protrusion 125.

By locking the securing unit S, the first plate 11 and the second plate 12 are not easily separated. There is a first gap between the wire casing 114 and the groove 121, and there is a second gap between the first protrusion 116 and the second protrusion 125 allowing the first plate 11 to have sufficient space to sink and measure weight during use of the invention.

Inpatients do not need to catch and weigh excreta during bathroom visits, followed by the cumbersome task of cleaning up. The weight measurement apparatus 100 makes it effortless to obtain the difference in body weight before and after every restroom visit, physical activity, or even before and after meals, allowing the weight measurement apparatus 100 to fully fulfill its purpose in people's lives, significantly enhancing their quality of life.

REFERENCE SIGNS LIST

100 weight measurement apparatus
1 base
11 first plate
111 circuit groove outlet
112 vertical plan
113 inclined plane
114 wire casing
115 fixing unit
116 first protrusion
117 locking hole
12 second plate
121 groove
122 fixing position
123 waterproof unit
124 fixed ground securing hole
125 second protrusion
126 first through-hole
127 second through-hole
13 sealing foam unit
2 display unit
21 first case body
211 first opening
212 second opening
22 second case body
3 weight measuring device
4 display panel
5 sensing activation device
6 supporting unit
7 transmission unit
8 external power cable
9 control circuit
91 battery box
V accommodation space
L rib
S securing unit

What is claimed is:

1. A weight measurement apparatus, comprising:

a base for being disposed on a ground, comprising a first plate, a second plate, and a weight measuring device disposed between the first plate and the second plate; wherein the second plate comprises a plurality of fixed ground securing holes for fixing the base on the ground;

wherein the first plate comprises a first protrusion located at a center thereof or a plurality of first protrusions spaced apart from each other, each first protrusion defining a locking hole; wherein the second plate comprises a second protrusion located at a center thereof or a plurality of second protrusions spaced apart from each other, each second protrusion corresponding to and aligned with a respective one of the first protrusions; wherein the second plate further comprises a first through-hole corresponding to each second protrusion; wherein each second protrusion comprises a second through-hole communicating with the first through-hole, wherein an inner diameter of the first through-hole is larger than an inner diameter of the second through-hole; wherein a securing unit extending through the first through-hole and the second through-hole and having a top portion secured to the locking hole of the corresponding first protrusion, thereby fixing the first plate and the second plate together; wherein a gap is defined between the first protrusion and the second protrusion so as to permit vertical displacement of the first plate relative to the second plate during weight measurement;

and a display unit comprising a display panel and a control circuit, for being disposed separately from the base, wherein the control circuit is electrically connected to the weight measuring device through a transmission unit and detects a deformation of the weight measuring device caused by a load applied between the first plate and the second plate through the transmission unit, wherein the display panel displays a weight value corresponding to the deformation.

2. The weight measurement apparatus as recited in claim 1, wherein the base comprises a sealing foam unit between the first plate and the second plate for enhancing the waterproof function between the first plate and the second plate.

3. The weight measurement apparatus as recited in claim 1, wherein the control circuit is connected to an external power supply through an external power cable for weight measuring.

4. The weight measurement apparatus as recited in claim 1, wherein the display unit comprises the display panel and the control circuit, wherein the control circuit comprises the external power supply cable and a battery box, which is configured to be connected to the external power supply source by the external power cable or the battery box loaded with at least one battery to provide power for weight measuring.

5. The weight measurement apparatus as recited in claim 1, wherein the display unit comprises the display panel, the control circuit and the battery box, wherein the control circuit comprises the external power supply cable which is configured to be connected to the external power supply source by the external power cable or the battery box loaded with at least one battery to provide power for weight measuring.

6. A weight measurement apparatus, comprising:

a base for being disposed on a ground, comprising a first plate, a second plate, and a weight measuring device disposed between the first plate and the second plate; wherein the first plate comprises a first protrusion located at a center thereof or a plurality of first protrusions spaced apart from each other, each first protrusion defining a locking hole; wherein the second plate comprises a second protrusion located at a center thereof or a plurality of second protrusions spaced apart from each other, each second protrusion corresponding to and aligned with a respective one of the first protrusions; wherein the second plate further comprises a first through-hole corresponding to each second protrusion; wherein each second protrusion comprises a second through-hole communicating with the first through-hole, wherein an inner diameter of the first through-hole is larger than an inner diameter of the second through-hole; wherein a securing unit extending through the first through-hole and the second through-hole and having a top portion secured to the locking hole of the corresponding first protrusion, thereby fixing the first plate and the second plate together; wherein a gap is defined between the first protrusion and the second protrusion so as to permit vertical displacement of the first plate relative to the second plate during weight measurement; and a display unit comprising a display panel, a control circuit, and a sensing activation device, for being disposed separately from the base, wherein the sensing activation device activates the display panel and the control circuit by sensing a gesture, wherein the control circuit is electrically connected to the weight measuring device through a transmission unit and detects a deformation of the weight measuring device caused a load applied between the first plate and the second plate through the transmission unit, wherein the display panel displays a weight value corresponding to the deformation.

7. The weight measurement apparatus as recited in claim 6, wherein the base comprises a sealing foam unit between the first plate and the second plate for enhancing the waterproof function between the first plate and the second plate, wherein the second plate comprises a plurality of fixed ground securing holes for fixing on the ground.

8. The weight measurement apparatus as recited in claim 6, wherein the control circuit is connected to an external power supply through an external power cable for weight measuring.

9. The weight measurement apparatus as recited in claim 6, wherein the display unit comprises the display panel and the control circuit, wherein the control circuit comprises the external power supply cable and a battery box, which is configured to be connected to the external power supply source by the external power cable or the battery box loaded with at least one battery to provide power for weight measuring.

10. The weight measurement apparatus as recited in claim 6, wherein the display unit comprises the display panel, the control circuit and the battery box, wherein the control circuit comprises the external power supply cable which is configured to be connected to the external power supply source by the external power cable or the battery box loaded with at least one battery to provide power for weight measuring.

11. A weight measurement apparatus, comprising:

a base for being disposed on a ground, comprising a first plate, a second plate, and a weight measuring device disposed between the first plate and the second plate, wherein a lateral side of the base comprises a concave area, wherein the concave area is paired with a floor-mounted urinal or a floor-mounted toilet; wherein the first plate comprises a first protrusion located at a center thereof or a plurality of first protrusions spaced apart from each other, each first protrusion defining a locking hole; wherein the second plate comprises a second protrusion located at a center thereof or a plurality of second protrusions spaced apart from each other, each second protrusion corresponding to and aligned with a respective one of the first protrusions; wherein the second plate further comprises a first through-hole corresponding to each second protrusion; wherein each second protrusion comprises a second through-hole communicating with the first through-hole, wherein an inner diameter of the first through-hole is larger than an inner diameter of the second through-hole; wherein a securing unit extending through the first through-hole and the second through-hole and having a top portion secured to the locking hole of the corresponding first protrusion, thereby fixing the first plate and the second plate together; wherein a gap is defined between the first protrusion and the second protrusion so as to permit vertical displacement of the first plate relative to the second plate during weight measurement; and a display unit comprising a display panel and a control circuit, for being disposed separately from the base, wherein the control circuit is electrically connected to the weight measuring device through a transmission unit and detects a deformation of the weight measuring device caused by a load applied between the first plate and the second plate through the transmission unit, wherein the display panel displays a weight value corresponding to the deformation.

12. The weight measurement apparatus as recited in claim 11, wherein the base comprises a sealing foam unit between the first plate and the second plate for enhancing the waterproof function between the first plate and the second plate, wherein the second plate comprises a plurality of fixed ground securing holes for fixing on the ground.

13. The weight measurement apparatus as recited in claim 11, wherein the control circuit is connected to an external power supply through an external power cable for weight measuring.

14. The weight measurement apparatus as recited in claim 11, wherein the display unit comprises the display panel and the control circuit, wherein the control circuit comprises the external power supply cable and a battery box, which is configured to be connected to the external power supply source by the external power cable or the battery box loaded with at least one battery to provide power for weight measuring.

15. The weight measurement apparatus as recited in claim 11, wherein the display unit comprises the display panel, the control circuit and the battery box, wherein the control circuit comprises the external power supply cable which is configured to be connected to the external power supply source by the external power cable or the battery box loaded with at least one battery to provide power for weight measuring.

* * * * *